(12) United States Patent
Prothero et al.

(10) Patent No.: US 12,166,622 B2
(45) Date of Patent: Dec. 10, 2024

(54) DEVICES, SYSTEMS, AND METHODS EMPLOYING POLYNOMIAL SYMBOL WAVEFORMS

(71) Applicant: Astrapi Corporation, Dallas, TX (US)

(72) Inventors: Jerrold Prothero, Delray Beach, FL (US); James J. Sterling, Chambersburg, PA (US)

(73) Assignee: Astrapi Corporation, Dallas, TX (US)

( * ) Notice: Subject to any disclaimer, the term of this patent is extended or adjusted under 35 U.S.C. 154(b) by 0 days.

(21) Appl. No.: 18/230,652

(22) Filed: Aug. 6, 2023

(65) Prior Publication Data

US 2023/0396483 A1  Dec. 7, 2023

Related U.S. Application Data

(63) Continuation of application No. 17/577,082, filed on Jan. 17, 2022, now Pat. No. 11,729,041, which is a continuation of application No. 17/060,181, filed on Oct. 1, 2020, now Pat. No. 11,228,477, which is a continuation of application No. 16/735,655, filed on Jan. 6, 2020, now Pat. No. 10,848,364.

(Continued)

(51) Int. Cl.
*H04L 27/34* (2006.01)
*H04L 27/26* (2006.01)
*H04L 27/36* (2006.01)

(52) U.S. Cl.
CPC ...... *H04L 27/3405* (2013.01); *H04L 27/2639* (2013.01); *H04L 27/2647* (2013.01); *H04L 27/3494* (2013.01); *H04L 27/363* (2013.01)

(58) Field of Classification Search
CPC ............... H04L 27/3405; H04L 27/363; H04L 27/2639; H04L 27/2647; H04L 27/3494; H04L 5/0008; H04L 27/0004; H04L 27/24

See application file for complete search history.

(56) References Cited

U.S. PATENT DOCUMENTS

| | | |
|---|---|---|
| 3,204,034 A | 8/1965 | Ballard |
| 3,384,715 A | 5/1968 | Higuchi |

(Continued)

FOREIGN PATENT DOCUMENTS

| | | |
|---|---|---|
| CN | 1271477 | 10/2000 |
| FR | 2638305 | 4/1990 |

(Continued)

OTHER PUBLICATIONS

Kvecher et al. An Analog Modulation Using a Spiral Mapping 2006 IEEE 24th Convention of Electrical and electronics Engineers in Israel, pp. 194-198 (5 pgs.).

(Continued)

*Primary Examiner* — Vineeta S Panwalkar
(74) *Attorney, Agent, or Firm* — Law Office of Michael Antone LLC; Michael Antone

(57) ABSTRACT

Systems, devices, and methods of the present invention enhance data transmission through the use of polynomial symbol waveforms (PSW) and sets of PSWs corresponding to a symbol alphabet is here termed a PSW alphabet. Methods introduced here are based on modifying polynomial alphabet by changing the polynomial coefficients or roots of PSWs and/or shaping of the polynomial alphabet, such as by polynomial convolution, to produce a designed PSW alphabet including waveforms with improved characteristics for data transmission.

20 Claims, 10 Drawing Sheets

Related U.S. Application Data

(60) Provisional application No. 62/814,404, filed on Mar. 6, 2019.

(56) References Cited

U.S. PATENT DOCUMENTS

| | | | |
|---|---|---|---|
| 5,034,911 | A | 7/1991 | Rachels |
| 5,205,169 | A | 4/1993 | Hagen |
| 5,349,272 | A | 9/1994 | Rector |
| 5,920,238 | A | 7/1999 | Cairns |
| 6,209,114 | B1 | 3/2001 | Wolf |
| 7,146,324 | B2 | 12/2006 | Brinker et al. |
| 7,327,803 | B2 | 2/2008 | Sorrells et al. |
| 7,355,470 | B2 | 4/2008 | Sorrells et al. |
| 7,647,030 | B2 | 1/2010 | Sorrells et al. |
| 8,438,447 | B2 | 5/2013 | Chen |
| 8,472,534 | B2 | 6/2013 | Prothero |
| 8,861,327 | B2 | 10/2014 | Prothero |
| 9,906,395 | B2 | 2/2018 | Prothero |
| 10,069,664 | B2 | 9/2018 | Prothero |
| 10,686,635 | B2 | 6/2020 | Prothero |
| 2002/0122505 | A1 | 9/2002 | Avidor et al. |
| 2003/0026357 | A1 | 2/2003 | Bartlett |
| 2003/0067990 | A1 | 4/2003 | Bryant |
| 2003/0133495 | A1 | 7/2003 | Lerner |
| 2004/0174737 | A1 | 9/2004 | Graffouliere |
| 2004/0213343 | A1 | 10/2004 | Komamura |
| 2004/0230387 | A1 | 11/2004 | Bechhoefer |
| 2005/0021319 | A1 | 1/2005 | Li et al. |
| 2005/0071742 | A1 | 3/2005 | Balinsky |
| 2005/0149296 | A1 | 7/2005 | Sieracki |
| 2006/0039455 | A1 | 2/2006 | Cairns |
| 2006/0227701 | A1 | 10/2006 | Johnson |
| 2007/0195952 | A1 | 8/2007 | Singanamala |
| 2008/0095121 | A1 | 4/2008 | Shattil |
| 2008/0130714 | A1 | 6/2008 | Wilborn |
| 2008/0198832 | A1 | 8/2008 | Chester |
| 2008/0298454 | A1 | 12/2008 | Lewis |
| 2008/0304666 | A1 | 12/2008 | Chester et al. |
| 2009/0003418 | A1 | 1/2009 | Karabinis |
| 2011/0150048 | A1 | 6/2011 | Prothero |
| 2011/0222584 | A1 | 9/2011 | Michaels |
| 2012/0076098 | A1 | 3/2012 | Han et al. |
| 2012/0263031 | A1 | 10/2012 | Prothero |
| 2013/0305120 | A1 | 11/2013 | Osamu et al. |
| 2014/0198869 | A1 | 7/2014 | Melzer et al. |
| 2015/0156049 | A1 | 6/2015 | Prothero |
| 2016/0212005 | A9 | 7/2016 | Jones et al. |
| 2019/0013974 | A1 | 1/2019 | Prothero |
| 2019/0229960 | A1 | 7/2019 | Lopez |

FOREIGN PATENT DOCUMENTS

| | | |
|---|---|---|
| JP | 08-079320 | 3/1996 |
| JP | 10-098497 | 4/1998 |
| WO | 1998049812 | 11/1998 |
| WO | 2004080022 | 9/2004 |
| WO | 2008072935 | 6/2008 |
| WO | 2010004586 | 1/2010 |
| WO | 2011084280 | 7/2011 |
| WO | 2012066383 | 5/2012 |
| WO | 2017040996 | 3/2017 |
| WO | 2018085771 | 5/2018 |

OTHER PUBLICATIONS

Prothero, "The Shannon Law for Non-Periodic Channels", Technical Report ASTRAPI Exponential ommunication, Mar. 2, 2012, 30 pgs—(XP055360929).

Piwnicki, "Modulation Methods Related to Sine-Wave Crossings", IEEE Transactions on Communications, COM-31, No. 4, Apr. 1983, pp. 503-508 (6 pgss.).

Prothero, "Euler's Formula for Fractional Powers of i", Apr. 15, 2007, 72 pgs.

Li et al, "Spiral QAM Modulated CO-OFDM System with Increased Tolerance toward Laser Phase Noise", International Conference on Computer Science and Service System (CSSS 2014), pp. 13-16.

Larsson, "On Performance Analysis of Retransmission Schemes with Fading Channels", Sep. 2018, KTH Royal Institute of Technology, Sweden.

Touch, "An Optical Turing Machine for Native Network Processing of Modulated Data" 2012, IEEE CCW 2012.

Larsson, "Golden Angle Modulation: Approaching the AWGN Capacity", arXiv:1802.10022v1 [cs.IT] Feb. 27, 2018.

Power Normalized Cairns PSW Alphabet Plot

Cairns PSW Alphabet with Zero Boundary Roots

Polynomial 1 Roots Before Symbol Boundary Time Edit

Polynomial 1 Roots After Symbol Boundary Time Edit

PSW-Gaussian Convolution

Fractional Cycle Modulation Waveforms

PSW Alphabet from Offset MC Optimization

PSW Alphabet Convolved with Sinc Function Polynomial

DEVICES, SYSTEMS, AND METHODS EMPLOYING POLYNOMIAL SYMBOL WAVEFORMS

CROSS-REFERENCE TO RELATED APPLICATIONS

This application is a continuation of U.S. patent application Ser. No. 17/577,082 filed 2022 Jan. 17, now U.S. patent Ser. No. 11/729,041 issued 2023 Aug. 15, which is a continuation of U.S. patent application Ser. No. 17/060,181 filed 2020 Oct. 1, now U.S. Pat. No. 11,228,477 issued 2022 Jan. 18, which is a continuation of U.S. patent application Ser. No. 16/735,655 filed 2020 Jan. 6, now U.S. Pat. No. 10,848,364 issued 2020 Nov. 24, which claims the benefit of and priority from U.S. Provisional Patent Application No. 62/814,404, filed 2019 Mar. 6, entitled "Devices, Systems, And Methods Employing Polynomial Symbol Waveforms", each of which is incorporated herein by reference in its entirety.

STATEMENT REGARDING FEDERALLY SPONSORED RESEARCH OR DEVELOPMENT

This invention was made with government support under Award #1738453 awarded by the National Science Foundation. The government has certain rights in the invention.

BACKGROUND OF THE INVENTION

Field of the Invention

The present invention relates in general to transmitting data, and, more specifically to systems, devices, and methods employing polynomial symbol waveforms to enable higher capacity data transmission.

Background Art

Applicant's prior U.S. Pat. No. 8,472,534 entitled "Telecommunication Signaling Using Non-Linear Functions" and U.S. Pat. No. 8,861,327 entitled "Methods and Systems for Communicating", the contents of which are herein incorporated by reference in their entirety, introduced spiral-based signal modulation. Spiral-based signal modulation may base signal modulation on complex spirals, rather than the traditional complex circles used by standard signal modulation techniques such as Quadrature Amplitude Modulation (QAM) and Phase-Shift Keying (PSK). The use of such advanced modulation formats enables higher capacity data transmission systems, devices, and methods.

Applicant's U.S. Pat. No. 10,069,664 entitled "Spiral Polynomial Division Multiplexing" (SPDM), the contents of which are herein incorporated by reference in their entirety, discloses the use of polynomials to describe signals and "Instantaneous Spectral Analysis" (ISA) to decompose arbitrary polynomials, which may represent a signal, into a sum of complex spirals, which may have a real-valued representation as a sum of sinusoids, each of which may have a continuously-varying amplitude. ISA introduced a method for identifying and grouping sinusoids with the same frequency together for transmission, such that the amplitude and power associated with each sinusoidal frequency at each instant in time in the spiral representation of a particular polynomial may be readily apparent.

With the continuing demand for high capacity data transmission systems, devices, and methods, there is a corresponding need for systems, devices, and methods that enable data to be more efficiently characterized for transmission.

BRIEF SUMMARY OF THE INVENTION

Systems, devices, and methods of the present invention enable more data transmission through the use of polynomial symbol waveform (PSW) design by modifying a polynomial alphabet by changing the polynomial coefficients or roots of the PSWs and/or shaping of the polynomial alphabet, such as by polynomial convolution, to produce a designed PSW alphabet including waveforms with improved characteristics for data transmission. The present invention may be employed with SPDM and ISA, as well as other polynomial design techniques.

A set of PSWs corresponding to a symbol alphabet is here termed a PSW alphabet. In various embodiments, transmitter and receivers may implement PSW alphabets produced via various PSW design methods that may include specifying the location of particular polynomial roots, such as: placing roots at the symbol time boundaries with amplitude zero to minimize symbol boundary discontinuities; translating the nearest polynomial root to a particular point in the complex plane; directly editing the location of one or more polynomial roots; adjusting the complex conjugate of an edited PSW root in order to keep the PSW real-valued; and shaping one of more PSWs using polynomial convolution with polynomial versions of the raised cosine, root raised cosine, Gaussian, or other pulse-shaping or band-limiting filters.

PSWs may provide communication benefits which may include greater noise resistance and greater data throughput, particularly when coupled with ISA-based transmission techniques to limit occupied bandwidth. This application introduces a coordinated set of methods to design PSWs to exploit these benefits within communication systems and devices including satellite and terrestrial wireless and wired systems.

In various embodiments, systems, transmitters, receivers, and methods of the present invention may employ manipulated polynomial symbol waveform alphabets designed using various stochastic methods, such as, but not limited to, Monte Carlo (MC) techniques, for optimization. The MC optimization may be started with an initial PSW alphabet, from which it generates random variations ("offsets"), referred to as "Offset MC", or a completely random PSW alphabet ("Fully random MC"). The MC routines may be based on polynomial roots or polynomial coefficients and may use polynomial convolution or specify fixed polynomial roots not altered by the stochastic method.

In various embodiments, Fractional Cycle Modulation (FCM), disclosed in the present invention, may be performed by constructing symbol waveforms from sinusoids some or all of which complete a fractional cycle (less than a full cycle) during each symbol time. FCM-based PSWs may be employed as the input, or initial, PSW alphabet for offset MC optimization. Convolution or other polynomial manipulations may be applied to an FCM-based PSW alphabet as well.

Various methods, devices including transmitters and receivers, non-transitory computer readable medium carrying instructions to be executed by one or more processors, and/or systems of the present invention may include providing, to a transmitter, an input bit sequence, converting, by the transmitter, the input bit sequence into a sequence of polynomial symbol waveforms (PSWs) selected from a designed PSW alphabet, and transmitting, by the transmitter, the sequence of polynomial symbol waveforms. The designed PSW alphabet may be formed by providing an initial PSW alphabet having polynomial coefficients and polynomial roots, modifying the initial PSW alphabet to produce the designed PSW alphabet. In various embodiments, Instantaneous Spectral Analysis (ISA) is performed on the sequence of polynomial symbol waveforms prior to transmission.

Various methods, devices, non-transitory computer readable medium carrying instructions, and/or systems may include modifying the PSW alphabet may include at least one of editing at least one of the polynomial coefficients or polynomial roots of the initial PSW alphabet to produce one of an edited PSW alphabet and the designed PSW alphabet, and shaping one of the edited PSW alphabet and initial PSW alphabet to produce the designed PSW alphabet. The initial PSW alphabet may be based on Fractional Cycle Modulation and/or other methods as described herein. Editing the PSW alphabet may include, translating at least one polynomial root from one or more PSWs of the PSW alphabet from a starting location to an end location in the complex plane, adjusting complex conjugates of translated roots that are complex to keep the polynomial real-valued, and shaping at least one of the translated and adjusted PSWs using polynomial convolution to provide the designed PSW alphabet. The end location for the translated polynomial roots are at the symbol time boundaries with amplitude zero. Shaping may be performed by convoluting the edited PSW with a polynomial representation of a filter. The polynomial convolution is performed using one of raised cosine, root raised cosine, Gaussian, or other band-limiting or pulse-shaping filters.

Various methods, devices, non-transitory computer readable medium carrying instructions, and/or systems may include modifying by applying random variation to either the polynomial coefficients or polynomial roots of an initial PSW alphabet to produce an edited PSW alphabet, and may include calculating a goodness measure for the initial and edited PSW alphabets, comparing the goodness measure of the initial PSW alphabet to the goodness measure of the edited PSW alphabet, and setting the initial PSW alphabet equal to the edited PSW alphabet when the edited PSW alphabet has a higher goodness measure. The random variation may be determined by a Monte Carlo optimization, machine learning, etc. A power normalization of the edited PSW alphabet may be performed after applying the random variation. The initial PSW alphabet may be set to the edited PSW alphabet when the goodness measure of the edited PSW alphabet is better than the goodness measure of the initial PSW alphabet.

The steps of editing, calculating, performing, comparing, and setting may be repeated for a user determined number of iterations and/or until the goodness measure of the edited PSW alphabet is not better than the initial PSW alphabet goodness measure for one or more iterations. The goodness measure for a PSW alphabet may be based on calculating the minimum Root Mean Square (RMS) separation between all pairs of PSWs with a higher minimum RMS separation being interpreted as a higher goodness measure. Converting the PSW alphabet may include performing a table lookup of the input bit sequence to determine a corresponding PSW.

The sequence of PSWs transmitted by the transmitter via a wireless and/or wired medium may be received by a receiver and the received sequence of PSWs may be converted to an output bit sequence, which may exit the receiver and system and/or be processed and transmitted further. Converting the received sequence of PSWs may include performing a table lookup of the received sequence of PSWs to determine a corresponding output bit sequence and may include selecting the output bit sequence that corresponds to PSW that corresponds most closely to the received sequence of PSWs. Receiving the signal may include recognizing the received sequence of PSWs using minimum distance signal detection.

As may be disclosed, taught, and/or suggested herein to the skilled artisan, the present invention addresses the continuing need for hardware and/or software systems, devices, and methods that enable increased data transmission capacity.

BRIEF DESCRIPTION OF THE DRAWINGS

Advantages of embodiments of the present invention will be apparent from the following detailed description of the exemplary embodiments thereof, which description should be considered in conjunction with the accompanying drawings, which are included for the purpose of exemplary illustration of various aspects of the present invention to aid in description, and not for purposes of limiting the invention.

Figure 1:
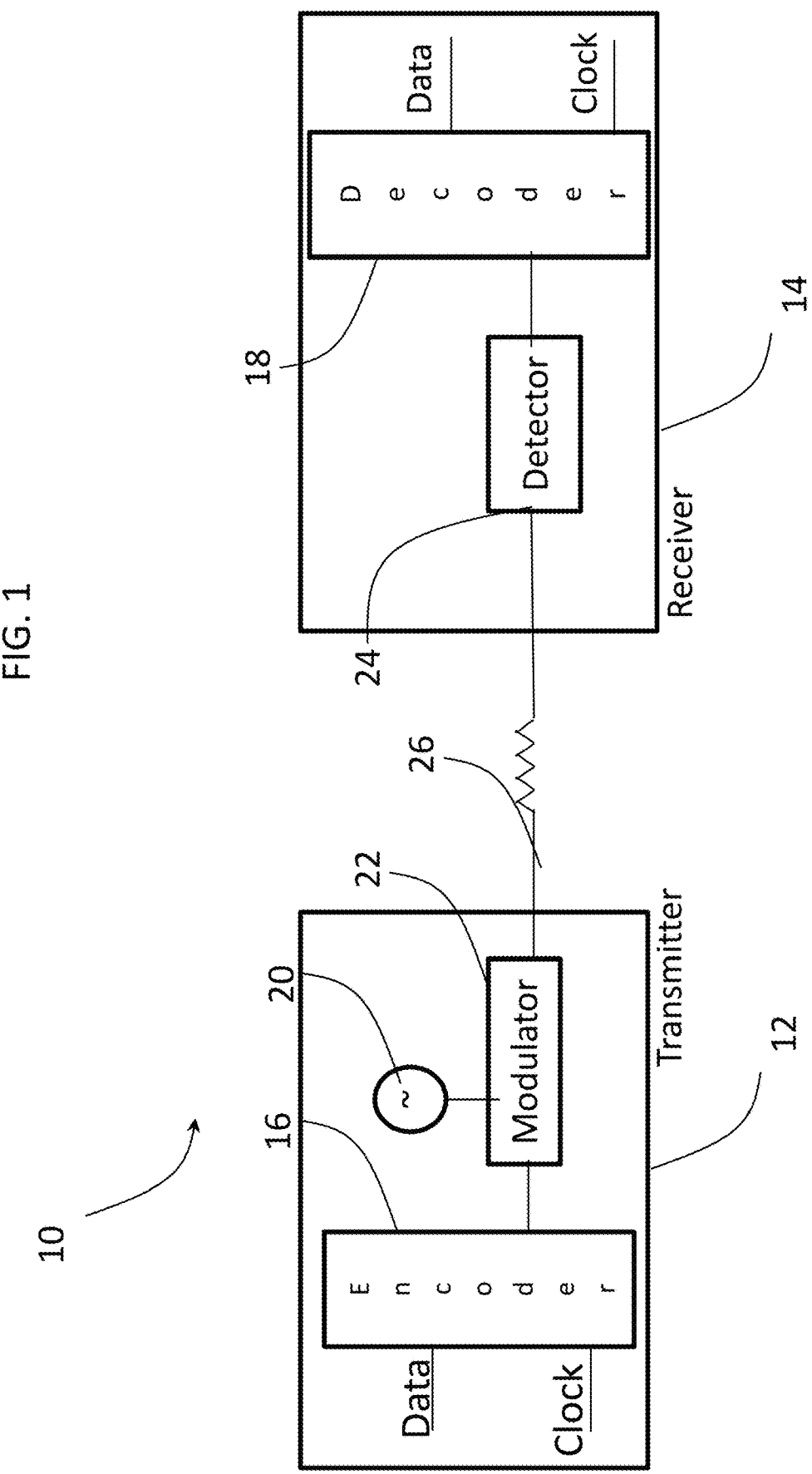
FIG. 1 illustrates exemplary data transmission systems.

In the drawings and detailed description, the same or similar reference numbers may identify the same or similar elements. It will be appreciated that the implementations, features, etc., described with respect to embodiments in specific figures may be implemented with respect to other embodiments in other figures, unless expressly stated, or otherwise not possible.

DETAILED DESCRIPTION OF THE INVENTION

Aspects of the invention are disclosed in the following description and related drawings directed to specific embodiments of the invention. Alternate embodiments may be devised without departing from the spirit or the scope of the invention. Additionally, well-known elements of exemplary embodiments of the invention will not be described in detail or will be omitted so as not to obscure the relevant details of the invention. Further, to facilitate an understanding of the description discussion of several terms used herein follows.

The word "exemplary" is used herein to mean "serving as an example, instance, or illustration" and not as a limitation. Any embodiment described herein as "exemplary" is not necessarily to be construed as preferred or advantageous over other embodiments. Likewise, the term "embodiments of the invention" does not require that all embodiments of the invention include the discussed feature, advantage or mode of operation.

Further, many embodiments are described in terms of sequences of actions to be performed by, for example, elements of a computing device. It will be recognized that various actions described herein can be performed by specific circuits (e.g., application specific integrated circuits (ASICs)), by field programmable gate arrays, by program instructions being executed by one or more processors, or by a combination thereof. Additionally, sequence(s) of actions described herein can be considered to be embodied entirely within any form of computer readable storage medium having stored therein a corresponding set of computer instructions that upon execution would cause an associated processor to perform the functionality described herein. Thus, the various aspects of the invention may be embodied in a number of different forms, all of which have been contemplated to be within the scope of the claimed subject matter. In addition, for each of the embodiments described herein, the corresponding form of any such embodiments may be described herein as, for example, "logic configured to" perform the described action.

Figure 2:
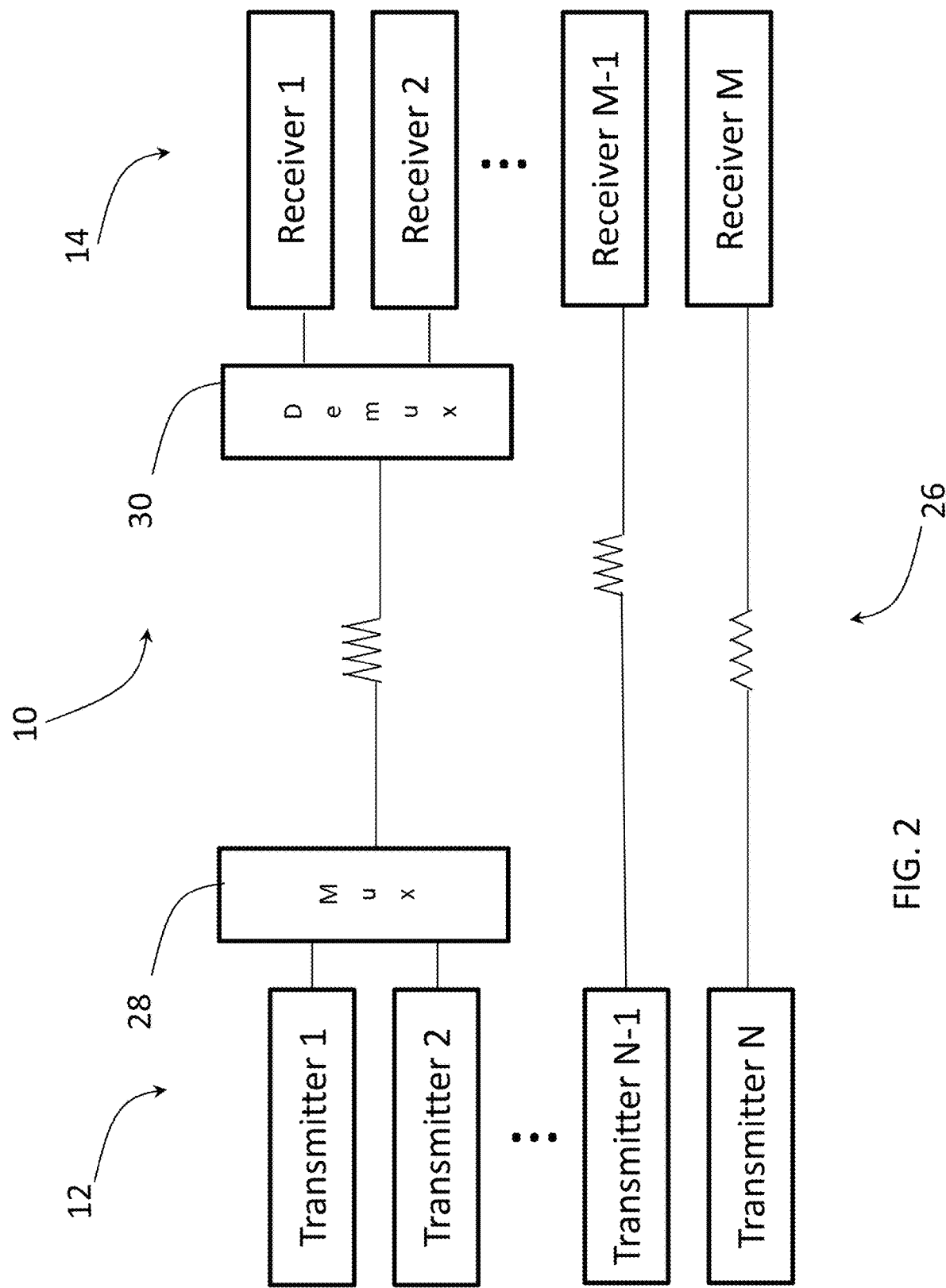
FIG. 2 illustrates exemplary data transmission systems.

FIG. 1 shows a system 10 including exemplary transmitter 12 and receiver 14 pairs that may be used in transmission or communication systems, such as further shown in FIG. 2. Bits, usually in the form of data, being input in a sequence to the system 10 may be converted to PSWs in a Channel Encoder 16 section of the transmitter 12, as well as have other signal processing performed to prepare the transmission signal. The PSWs may then be used to modulate a carrier provided by a carrier source 20 using an external modulator 22 as shown in FIG. 1 or to directly modulate the carrier source 20 to produce the transmission signal. Particularly if implemented in conjunction with ISA transmission, the PSWs may be transmitted using multiple carriers simultaneously. While the Encoder 16 and Decoder 18 are shown as single blocks in FIG. 1, it will be appreciated that the Encoder 16 and Decoder 18 may include one or more stages/components that are used to process the information passing through the system, as desired by the skilled artisan.

At the receiver 14, a detector 24 may detect the transmission signal and provide the transmission signal to signal processors, which may include the decoder 18 to perform any decoding necessary to output the bits. The bits output from the system 10 may be in the form of data and clock signals, or otherwise.

FIG. 2 shows exemplary systems 10 that include a plurality of transmitters 12 and receivers 14 that may be deployed in various transmission and communication systems employing various wired and wireless transmission media 26 and may include PSW technology of the present invention. For example, systems 10, such as shown in FIG. 1 and FIG. 2 and other systems, may be deployed in various electrical and optical wired transmission and communication networks, as well as satellite and terrestrial wireless networks. In various systems, the transmission signals may be multiplexed in a multiplexer 28 before transmission and may require demultiplexing before detection in a demultiplexer 30 after transmission, as is commonly performed in wired and wireless systems carrying multiple channels.

PSW manipulation technology of the present invention may be implemented in some or all of the transmitters and receivers in a system or network or only some portion of the transmitters and receivers in the system or network. In this manner, the PSW manipulation technology of the present invention may be rolled into new network builds, as well as retrofitted into existing networks to provide additional capacity in existing networks that include transmitters and receivers employing traditional signal modulation technology. Transmitters and receivers of the present invention may be deployed in existing networks to provide additional capacity in networks with unused channels. In addition, one or more transmitter and receiver pairs of the present invention may be used to replace traditional transmitters and receivers already deployed in existing networks to provide additional capacity.

A PSW individually, or a PSW alphabet collectively, can be represented in terms of standard algebraic or Taylor coefficients, as well as in terms of its polynomial roots. An infinite number of PSW alphabets are possible in principle. For illustrative purposes, the first eight Cairns polynomials (collectively, an 8-symbol PSW alphabet) may be used as described below. See U.S. Pat. No. 10,069,664 for background on the Cairns polynomials. The PSWs may be normalized to have the same power over the symbol time.

Figure 3:
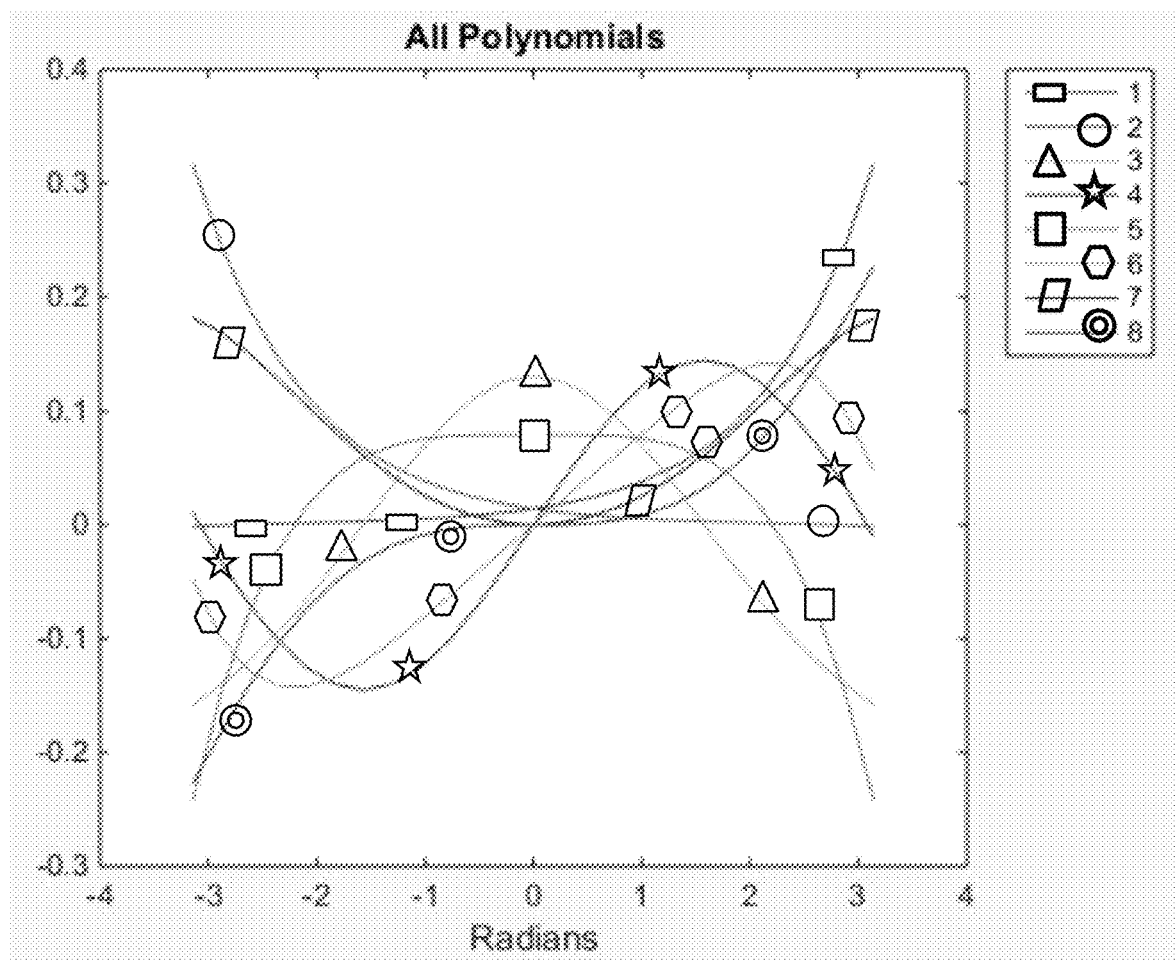
FIG. 3 illustrates an exemplary plot of Power Normalized Cairns PSW Alphabets.

FIG. 3 shows an exemplary plot of a normalized Cairns 8-symbol PSW alphabet specified equivalently in terms of (a) standard coefficients, (b) Taylor coefficients and (c) polynomial roots as shown in the following tables (a), (b), and (c).

| (a) | | | | | | | | |
|---|---|---|---|---|---|---|---|---|
| | $t^7$ | $t^6$ | $t^5$ | $t^4$ | $t^3$ | $t^2$ | $t$ | 1 |
| 1 | 2.76737e−06 | 1.9346e−05 | 1.1608e−04 | 5.8039e−04 | 0.0023 | 0.0070 | 0.0139 | 0.0139 |
| 2 | −2.76737e−06 | 1.9346e−05 | −1.1608e−04 | 5.8039e−04 | −0.0023 | 0.0070 | −0.0139 | 0.0139 |
| 3 | 0 | −1.8151e−04 | 0 | 0.0054 | 0 | −0.0653 | 0 | 0.1307 |
| 4 | −2.8733e−05 | 0 | 0.0012 | 0 | −0.0241 | 0 | 0.1448 | 0 |
| 5 | 0 | 0 | 0 | −0.0033 | 0 | 0 | 0 | 0.0794 |
| 6 | 0 | 0 | −6.7242e−04 | 0 | 0 | 0 | 0.0807 | 0 |
| 7 | 0 | −7.0083e−05 | 0 | 0 | 0 | 0.0252 | 0 | 0 |
| 8 | −9.8749e−06 | 0 | 0 | 0 | 0.0083 | 0 | 0 | 0 |

| (b) | | | | | | | | |
|---|---|---|---|---|---|---|---|---|
| | $t^7/7!$ | $t^6/6!$ | $t^5/5!$ | $t^4/4!$ | $t^3/3!$ | $t^2/2!$ | $t$ | 1 |
| 1 | 0.0139 | 0.0139 | 0.0139 | 0.0139 | 0.0139 | 0.0139 | 0.0139 | 0.0139 |
| 2 | −0.0139 | 0.0139 | −0.0139 | 0.0139 | −0.0139 | 0.0139 | −0.0139 | 0.0139 |
| 3 | 0 | −0.1307 | 0 | 0.1307 | 0 | −0.1307 | 0 | 0.1307 |

-continued

| (b) | | | | | | | |
|---|---|---|---|---|---|---|---|
| $t^7/7!$ | $t^6/6!$ | $t^5/5!$ | $t^4/4!$ | $t^3/3!$ | $t^2/2!$ | $t$ | 1 |
| 4 | −0.1448 | 0 | 0.1448 | 0 | −0.1448 | 0 | 0.1448 | 0 |
| 5 | 0 | 0 | 0 | −0.0794 | 0 | 0 | 0 | 0.0794 |
| 6 | 0 | 0 | −0.0807 | 0 | 0 | 0 | 0.0807 | 0 |
| 7 | 0 | 0.0505 | 0 | 0 | 0 | 0.0505 | 0 | 0 |
| 8 | −0.0498 | 0 | 0 | 0 | 0.0498 | 0 | 0 | 0 |

| (c) | | | | | | | |
|---|---|---|---|---|---|---|---|
| | Root 1 | Root 2 | Root 3 | Root 4 | Root 5 | Root 6 | Root 7 |
| 1 | −2.7590 + 0.0000i | −2.3799 − 1.6290i | −2.3799 + 1.6290i | −1.1472 − 3.1240i | −1.1472 + 3.1240i | 1.4066 − 4.2251i | 1.4066 + 4.2251i |
| 2 | 2.7590 + 0.0000i | 2.3799 − 1.6290i | 2.3799 + 1.6290i | 1.1472 − 3.1240i | 1.1472 + 3.1240i | −1.4066 − 4.2251i | −1.4066 + 4.2251i |
| 3 | −1.5699 + 0.0000i | 1.5699 + 0.0000i | NaN + 0.0000i | −3.9281 − 1.2892i | −3.9281 + 1.2892i | 3.9281 − 1.2892i | 3.9281 + 1.2892i |
| 4 | −3.0786 + 0.0000i | 0.0000 + 0.0000i | 3.0786 + 0.0000i | −4.4340 − 1.8438i | −4.4340 + 1.8438i | 4.4340 − 1.8438i | 4.4340 + 1.8438i |
| 5 | −2.2134 + 0.0000i | 2.2134 + 0.0000i | NaN + 0.0000i | NaN + 0.0000i | NaN + 0.0000i | −0.0000 − 2.2134i | 0.0000 + 2.2134i |
| 6 | −3.3098 + 0.0000i | 0.0000 + 0.0000i | 3.3098 + 0.0000i | NaN + 0.0000i | NaN + 0.0000i | −0.0000 − 3.3098i | 0.0000 + 3.3098i |
| 7 | −4.3559 + 0.0000i | 0.0000 + 0.0000i | 0.0000 + 0.0000i | 4.3559 + 0.0000i | NaN + 0.0000i | −0.0000 − 4.3559i | −0.0000 + 4.3559i |
| 8 | −5.3836 + 0.0000i | 0.0000 + 0.0000i | 0.0000 + 0.0000i | 0.0000 + 0.0000i | 5.3836 + 0.0000i | 0.0000 − 5.3836i | 0.0000 + 5.3836i |

In each of the above tables, the row number corresponds to the polynomial number in the legend of FIG. 3. A coefficient representation of a PSW alphabet (table (a): Cairns PSW Alphabet Standard Algebraic Coefficients or table (b): Cairns PSW Alphabet Taylor Coefficients) may be necessary for calculating time-sequence amplitude values for symbol waveforms as part of transmission stream generation. The coefficient representations are also useful for PSW alphabet design.

As further described below, polynomial roots-based PSW alphabet representations (e.g., table (c)) may be also very useful for PSW alphabet design. It may be desirable to be able to switch between polynomial coefficient and polynomial roots representations. Techniques for doing so are well-known to the art, and are implemented, for instance, using the well-known MATLAB® roots and poly functions.

When translating back and forth between PSW alphabet coefficient and roots representations, there are two issues to consider, 1) the roots of a polynomial only specify a particular polynomial to within a constant scaling factor, and 2) different polynomials in the same PSW alphabet may have different numbers of roots.

With regard to the 1$^{st}$ issue, consider that the roots specify the zero-crossings of a polynomial, but zero crossings are not affected by scale. Consequently, the roots representation of a polynomial does not specify the scale of the polynomial.

For example, if we know that the roots of a polynomial are 2 and 3, one possible equation is:

$$(t-2)(t-3)=0 \tag{3.1}$$

which can be expanded as $$t^2-5t+6=0 \tag{3.2}$$

Equation 3.1 is not affected by multiplying by a constant k, but the coefficients are affected by a scaling factor of k. Effectively, the equivalence between polynomial coefficients and polynomial roots is only precise to within a scaling factor. Therefore, where the ability to translate uniquely back and forth between polynomial coefficients and roots representations may be desirable, a "polynomial scaling factor" may be specified and stored for each polynomial in order to create an equivalence between polynomial coefficients and polynomial roots. Generally, this scaling factor may be determined by power normalization.

The second issue to consider is that the polynomials in a PSW alphabet may not all have the same number of roots, which arises because the number of roots is equal to the highest degree of a polynomial's terms. If different polynomials in the PSW alphabet have different highest degrees, then they will have different numbers of roots.

For instance, in table (b) (Cairns PSW Alphabet Taylor Coefficients), the polynomials corresponding to rows 1, 2, 4 and 8 are seventh degree and have seven roots; the polynomials corresponding to rows 3 and 7 are sixth degree and have six roots; the polynomial corresponding to row 6 is fifth degree and has five roots; and the polynomial corresponding to row 5 is fourth degree and has four roots. Subject to the considerations in the next paragraph, these observations are readily confirmed by reference to table (c) containing the actual roots.

The possible heterogeneity of the number of roots in a PSW alphabet is mainly a data management issue. In order to store the PSW alphabet roots in a square array, some entries have to be marked as 'not roots'. This may be done using a special character, such as the MATLAB® 'Not a Number' (NaN), as shown in table (c) for the Cairns PSW Alphabet Roots. Note that the number of 'NaN' roots entries that a polynomial has is equal to the difference between the highest degree represented and the degree of the particular polynomial.

Given the above framework, one or more polynomials in a PSW alphabet may be modified by changing, or editing, either the polynomial coefficients or their roots and/or shaping the initial PSW alphabet to produce a designed PSW alphabet. One application of roots editing is to place polynomial roots at symbol time boundaries in order to reduce inter-symbol discontinuities. For instance, in FIG. 3, the Cairns PSW Alphabet Plot, the PSWs have very different amplitudes at both the start and end of the symbol time. In a transmission stream constructed from a sequence of these PSWs, this may result in significant inter-symbol discontinuities and increase the Occupied Bandwidth (OBW) of the transmitted signal. One of ordinary skill will appreciate that it is generally desirable to maximize the bits/bandwidth (i.e., Hertz) transmitted in a transmission system.

An approach to removing zeroth-order Derivative Discontinuities (DDs) is to apply root editing to each polynomial to place a root at the start and end of each symbol time. This forces each PSW to start and end at zero amplitude. While in principle any polynomial roots can be moved to the symbol boundary times, polynomial modification may be minimized by moving the roots that were initially closest to the boundary.

Figure 4:
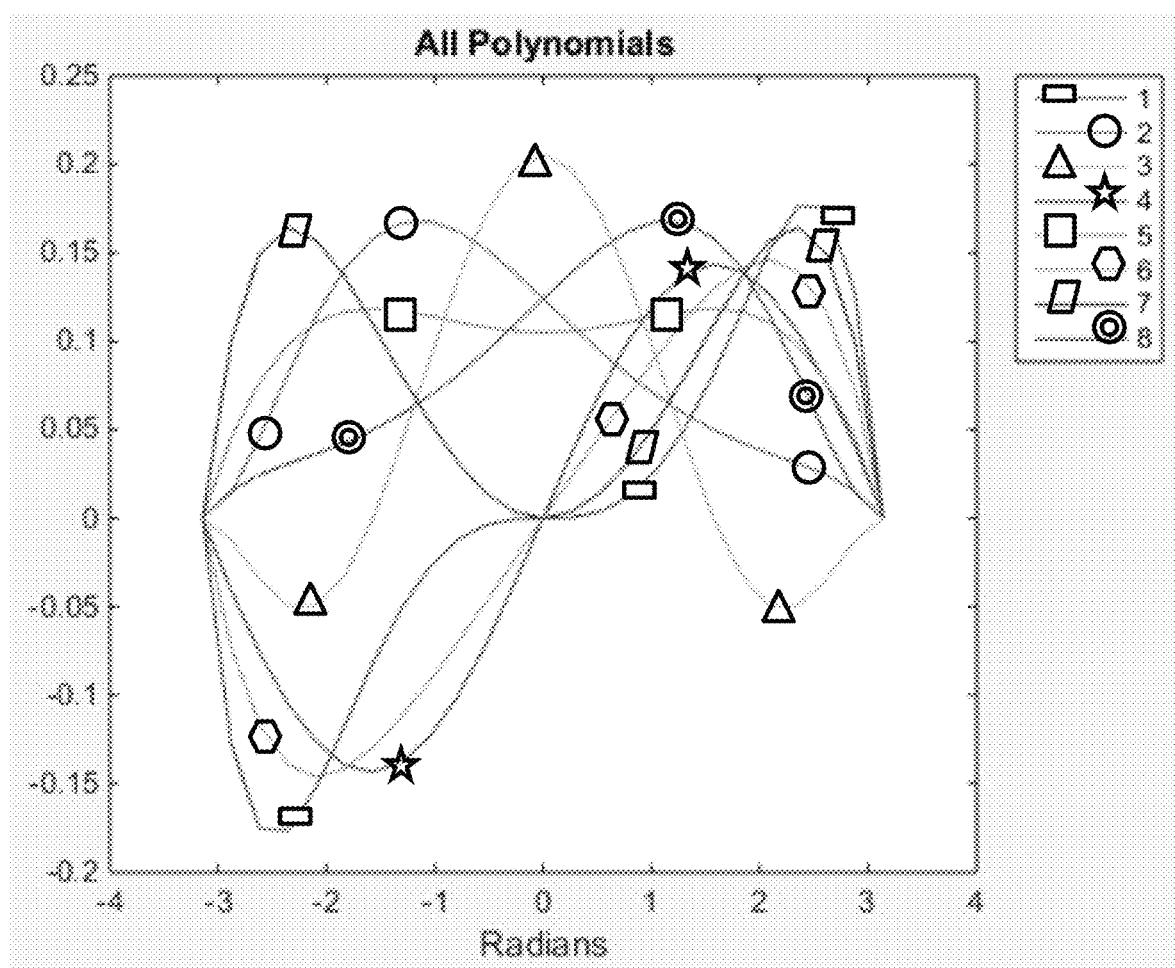
FIG. 4 illustrates an exemplary plot of Cairns PSW Alphabet with Zero Boundary Roots.

The equivalent of FIG. 3, Cairns PSW Alphabet Plot, with roots edited in this way is shown in FIG. 4, the Cairns PSW Alphabet with Zero Boundary Roots.

Figure 5:
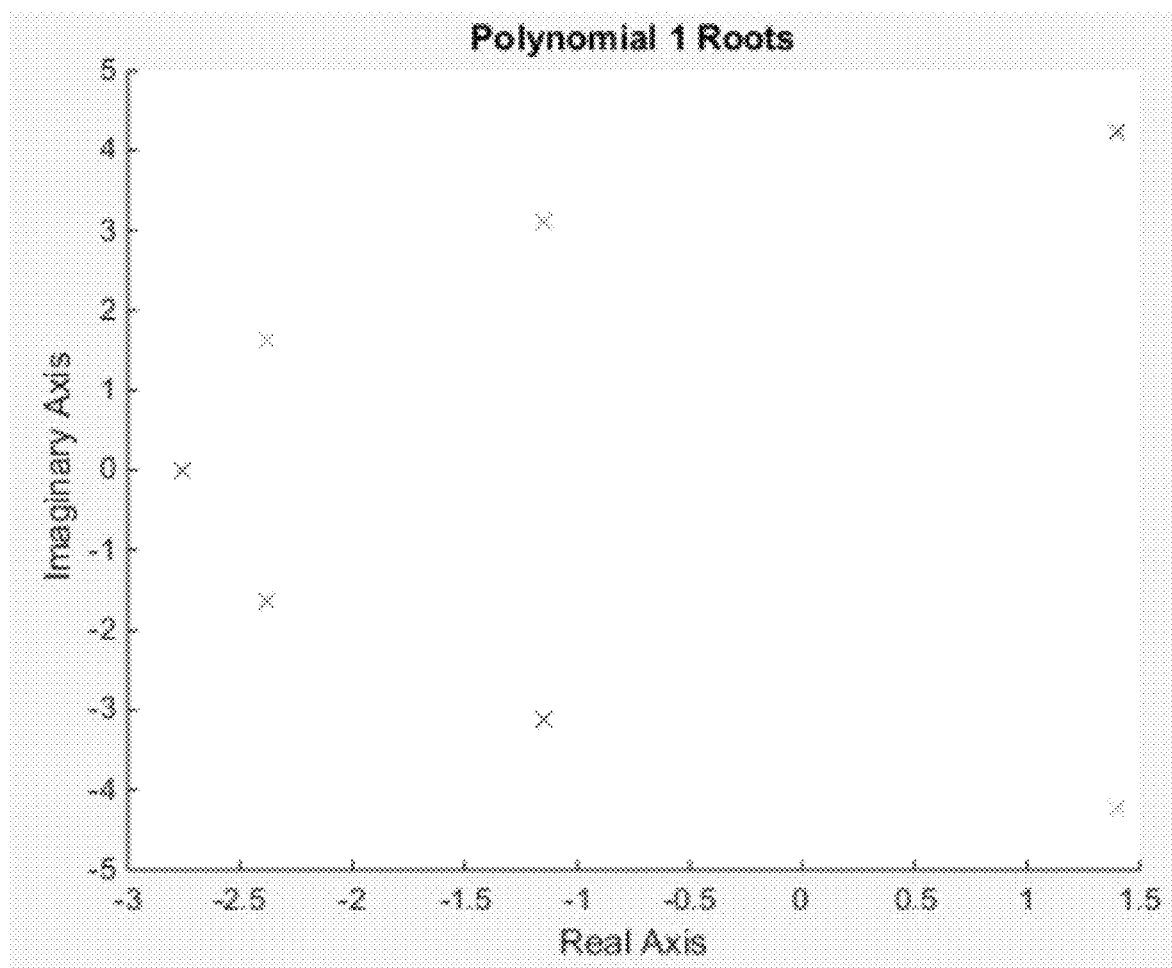
FIG. 5 illustrates an exemplary plot of Polynomial 1 Roots Before Symbol Boundary Time Edit.
Figure 6:
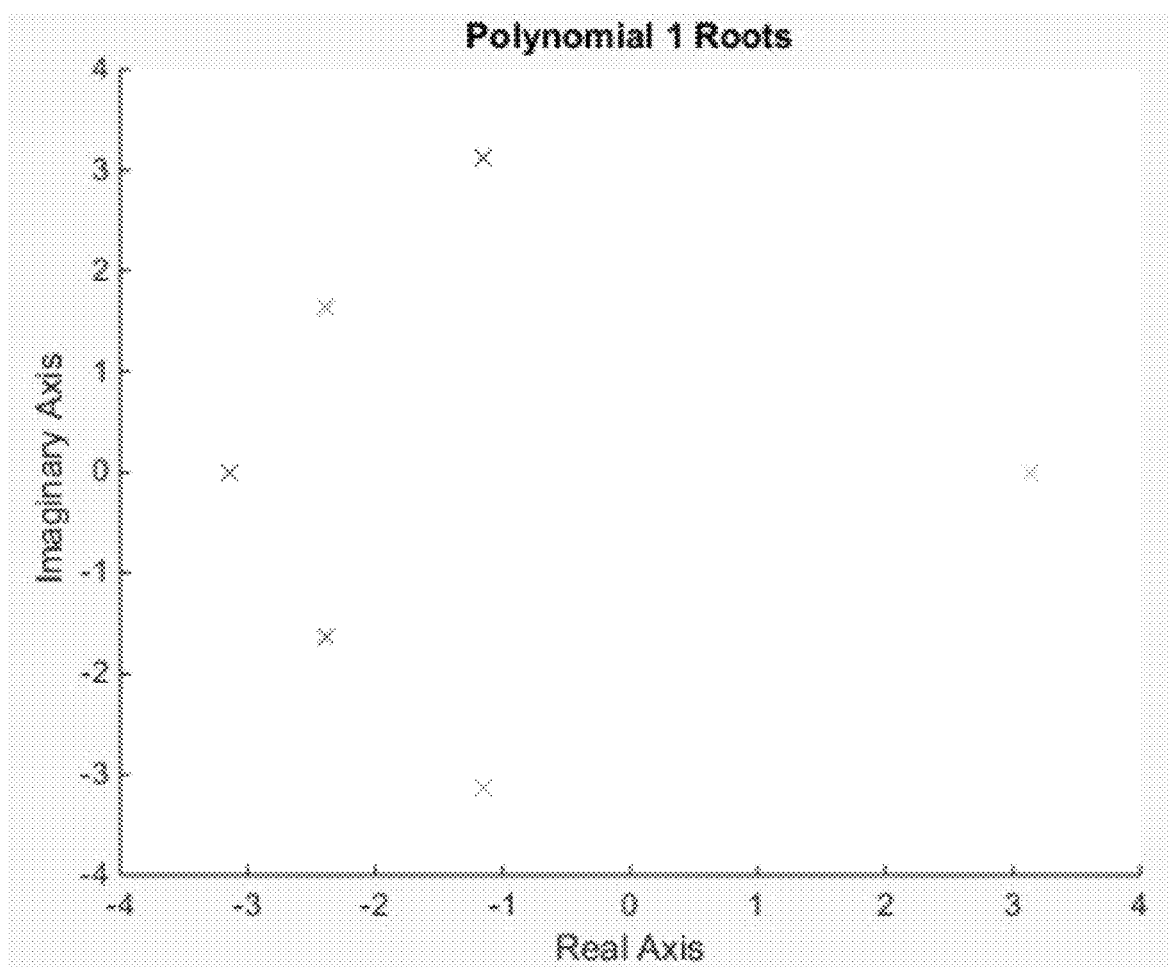
FIG. 6 illustrates an exemplary plot of Polynomial 1 Roots After Symbol Boundary Time Edit.

For illustrative purposes, FIGS. 5 and 6 show the roots of polynomial number 1 from the Cairns PSW alphabet table (a) before and after the nearest roots are moved to the symbol time boundaries of $-\pi$ and $\pi$ in radians. Note that because the PSWs are real-valued, every root with a non-zero imaginary part must have a matching root which is its complex conjugate (same real value, negative imaginary value). Consequently, if a complex root is altered, its conjugate root must be altered in the corresponding way, so that the roots remain conjugates. This may be seen in FIGS. 5 and 6, where the two conjugate roots on the right both moved to the value of $\pi$ on the real axis.

Figure 7:
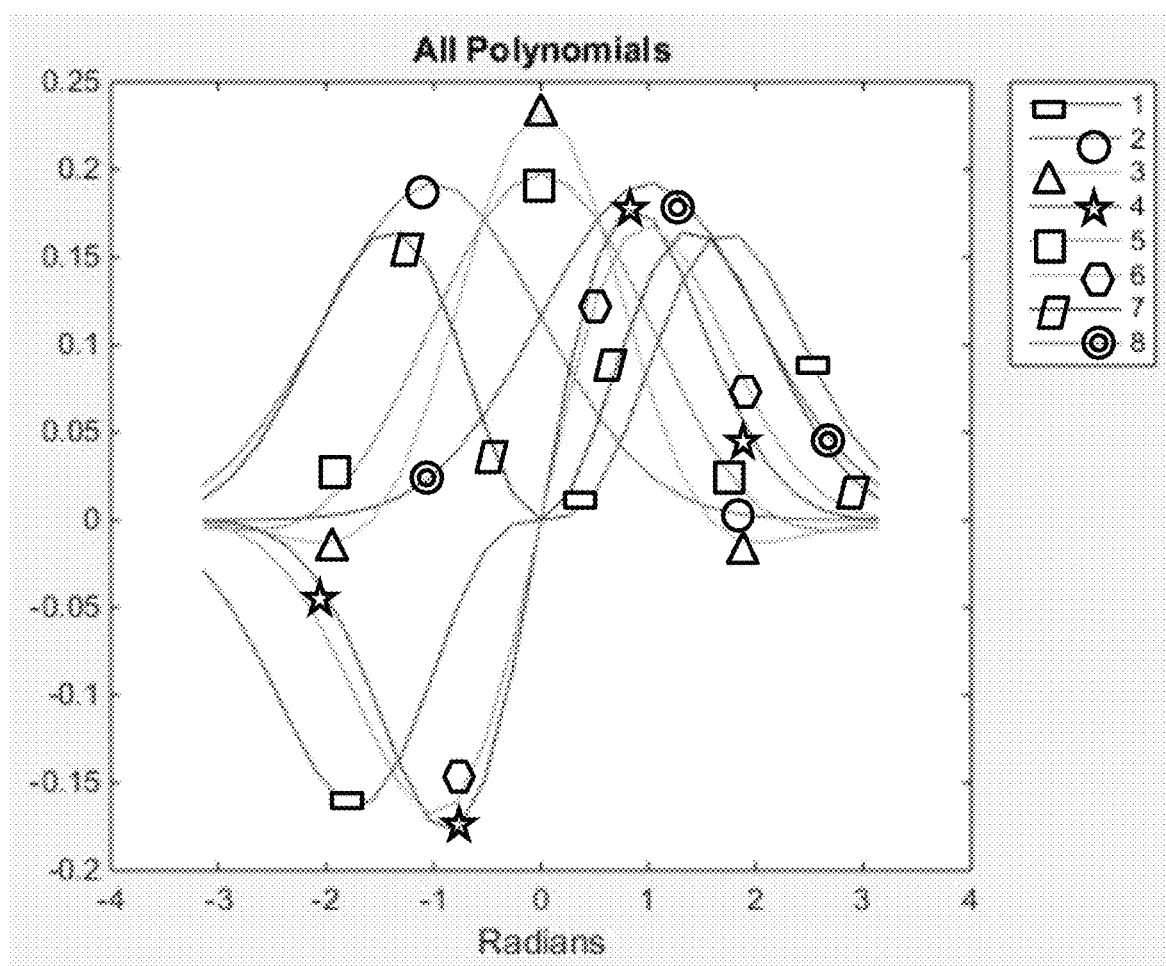
FIG. 7 illustrates an exemplary plot of a PSW-Gaussian Convolution.

In addition to editing polynomial roots, another technique to reduce OBW may be to convolve PSW coefficients with the polynomial equivalent of pulse-shaping filters. As an illustrative example, a Gaussian convolution polynomial may be created with the following MATLAB code fragment, for a specified value of $\sigma$ and a specified number of polynomial terms. The Gaussian mean value may be taken to be zero. Note that this code coverts the standard Gaussian parameter of $x^2$ to an equivalent representation in terms of x in order to facilitate convolution with PSWs that are expressed in terms of powers of x.

coeff=1/(2*sigma^2);
num_terms_x=num_terms;
num_terms_x2=floor(num_terms/2);
polyx=zeros(1,num_terms_x);
polyx2=zeros(1,num_terms_x2);
for idx=0:num_terms_x2−1
  polyx2(idx+1)=((−1*coeff)^idx)/factorial(idx));
  polyx(2*idx+1)=polyx2(idx+1);
end
cony poly=fliplr(polyx)*sqrt(coeff/pi);

FIG. 7, PSW-Gaussian Convolution, shows the effect of convolving the PSW alphabet shown in FIG. 3, the Cairns PSW Alphabet Plot, with the Gaussian polynomial having $\sigma=1$. It can be seen that Gaussian convolution produces boundary smoothing, which tends to improve OBW. Convolution generally improves with more terms. In this example, the number of terms in both the PSW alphabet and the Gaussian was taken as 64, and the result of the convolutions were truncated to 64 terms. The same approach can be used to apply other filters within the context of PSWs, such as the raised cosine filter and the root raised cosine filter.

Stochastic Optimization of PSWs

Stochastic optimization methods, which are optimization methods that generate and use random variables, are well-known. However, their application in the telecommunication industry to symbol waveform design, and more particularly to PSW alphabet design, has not previously been disclosed.

Monte Carlo (MC) optimization is a particular well-known kind of stochastic optimization; however, MC optimization and other stochastic optimizations have not previously been applied to PSW alphabet design. Methods for applying MC optimization to PSW alphabet design are disclosed here for illustrative purposes. However, the application of other forms of optimization, such as simulated annealing, machine learning, etc. are also contemplated by this disclosure.

MC optimization may be applied to PSW manipulation to make the polynomials in a PSW alphabet as distinct from each other as possible. The greater the distinguishability between the PSWs, the easier it will be for the demodulator to distinguish between them in the presence of Additive White Gaussian Noise (AWGN) or other channel impairments, and thus to improve (lower) the Bit Error Rate (BER) performance as a function of the energy per bit to noise power spectral density ratio (Eb/No).

A useful measure for the distinguishability between two polynomials is the Root Mean Square (RMS) separation between the values of the two polynomials at a set of sample points in the symbol time. Other distinguishability measures are also possible, but RMS is used here for illustrative purposes.

Thus, an important problem which can be addressed with MC optimization is to maximize the minimum RMS separation between all pairs of polynomials in a PSW alphabet. However, a conflicting constraint is the need to also control for OBW. Maximizing minimum RMS separation by itself may lead to a PSW alphabet exhibiting high boundary Derivative Discontinuities (DDs) or other waveform features that may produce high OBW.

The PSW alphabet MC optimization may be a balance between maximizing polynomial distinguishability (possibly measured by RMS separation), while minimizing or at least constraining OBW. Exemplary techniques for balancing these objectives are described for illustrative purposes below. However, other similar optimization problems are also contemplated by this disclosure, such as the opposite problem of minimizing PSW alphabet OBW with a PSW alphabet RMS separation constraint.

The following considerations affect MC optimization implementation of PSW alphabet optimization:

A number of MC trials, for instance one million, must be specified.

The MC can operate in terms of random variation applied to either polynomial coefficients or polynomial roots.

In each MC trial, the MC optimization can start either from a random PSW alphabet ("fully random" MC), or from a specified input, or initial, PSW alphabet to which the MC optimization generates random offsets. We call the latter approach "offset MC".

Effectively, the difference between fully random MC and offset MC is that in the former random variation is added to zero-valued polynomial coefficients or roots, and in the latter random variation is added to specified polynomial coefficients or roots.

Fully random MC may be useful if one has no knowledge of what a good PSW alphabet is likely to be for a particular communication/data transmission problem. Offset MC may be useful if one has a reasonable candidate PSW alphabet which one wants to further improve.

On each MC trial, a specified amount of random variation may be added to each polynomial coefficient or polynomial root. One method of specifying the amount of random variation may be in terms of the mean RMS of the PSWs in a PSW alphabet. For instance, if the mean RMS of all polynomials in a PSW alphabet is R, evaluated at specified sample points across the symbol time, then the amount of random variation to be added to each coefficient or root of each polynomial could be specified (for instance) to be between zero and 0.1*R.

On each MC trial, after adding random variation, the PSW alphabet may be power normalized. Otherwise, the generated PSW alphabet may generate a high minimum RMS separation between any pair of polynomials not because the PSW alphabet may be inherently good, but merely because the random variation happened to increase its overall power, and hence RMS separation.

On each MC trial, some constraint check or operation may be necessary. For instance, in order to control for OBW, a constraint may be specified that the symbol time boundary zeroth, first, and/or second DDs between any pair of polynomials can be no greater than a particular value. If this constraint is not met, the PSW alphabet generated by the MC trial may be rejected, regardless of its minimum RMS separation.

As another illustrative example, a constraint may be applied that every polynomial in the PSW alphabet generated by a MC trial should be convolved with a pulse-shaping polynomial for OBW control as described above. This convolution typically should occur before the minimum RMS separation calculation. In the case of a constraint such as convolution which may alter power, power normalization typically should occur after the constraint is applied.

On each MC trial, a "goodness value" of the generated PSW alphabet must be calculated. For illustrative purposes, minimum RMS separation between any pair of PSW alphabet polynomials may be considered to be the goodness value. However, other goodness values are possible and contemplated by this disclosure.

On each MC trial, if the goodness value exceeds the goodness value of any previous MC trial, the generated PSW alphabet and its goodness value are stored as the candidate best solution.

After all MC trials, the best PSW alphabet generated and its goodness value are returned. In the case of offset MC, if the best PSW alphabet generated has a lower goodness value than the input PSW alphabet then this fact should be noted.

In the case of offset MC, a series of MC trials may be run in which at the end of each series the best PSW alphabet (if it has a better goodness value than the input/initial PSW alphabet) or the input PSW alphabet (otherwise) may be used as the input/initial PSW alphabet for the next series.

If a series of offset MC optimizations are run, each consisting of a number of trials, the amount of randomness added in each run may be varied. In general, initially the amount of randomness should be relatively high, to search a broad PSW alphabet space. As the generated PSW alphabet goodness values approach a limiting value, the amount of randomness should be lowered in order to search more intensely close to a good solution.

If randomization is applied to polynomial roots, care must be taken to make sure that the polynomial remains real-valued, so that any stream of time amplitude values produced from the PSW alphabet will be real-valued. For a polynomial to be real-valued, every complex root must have a paired complex conjugate. A method for insuring that a polynomial remains real-valued is:

If a root is real, add a real-valued random variation.

If a root is complex, it must have a paired root which is its complex conjugate. Add a complex random offset to the complex root, then adjust the root's complex conjugate accordingly.

Optionally, some polynomial roots may be specified as 'fixed': i.e., the MC optimization is not allowed to alter them. For instances, roots may be fixed at the symbol time boundaries to ensure that all PSWs generated will have zero amplitude at the start and end of each symbol time.

Fractional Cycle Modulation

The technique of constructing a signal from one or more sinusoidal waves, each of which finishes one or more complete cycles during a symbol time or Transition Time Interval (TTI), is well-known in telecommunications. Notably, Orthogonal Frequency-Division Multiplexing (OFDM) works on this principle.

The present invention includes the use of Fractional Cycle Modulation (FCM), in which sinusoidal symbol waveforms may complete a fraction (which may be less than one) of a complete cycle per symbol time. An exemplary FCM symbol waveform alphabet is shown in FIG. 8, Fractional Cycle Modulation Waveforms.

FCM has not previously been applied to telecommunications. However, the present invention enables FCM to be implemented for data transmission by using FCM symbol waveforms represented by polynomials and defining PSW alphabets.

Figure 8:
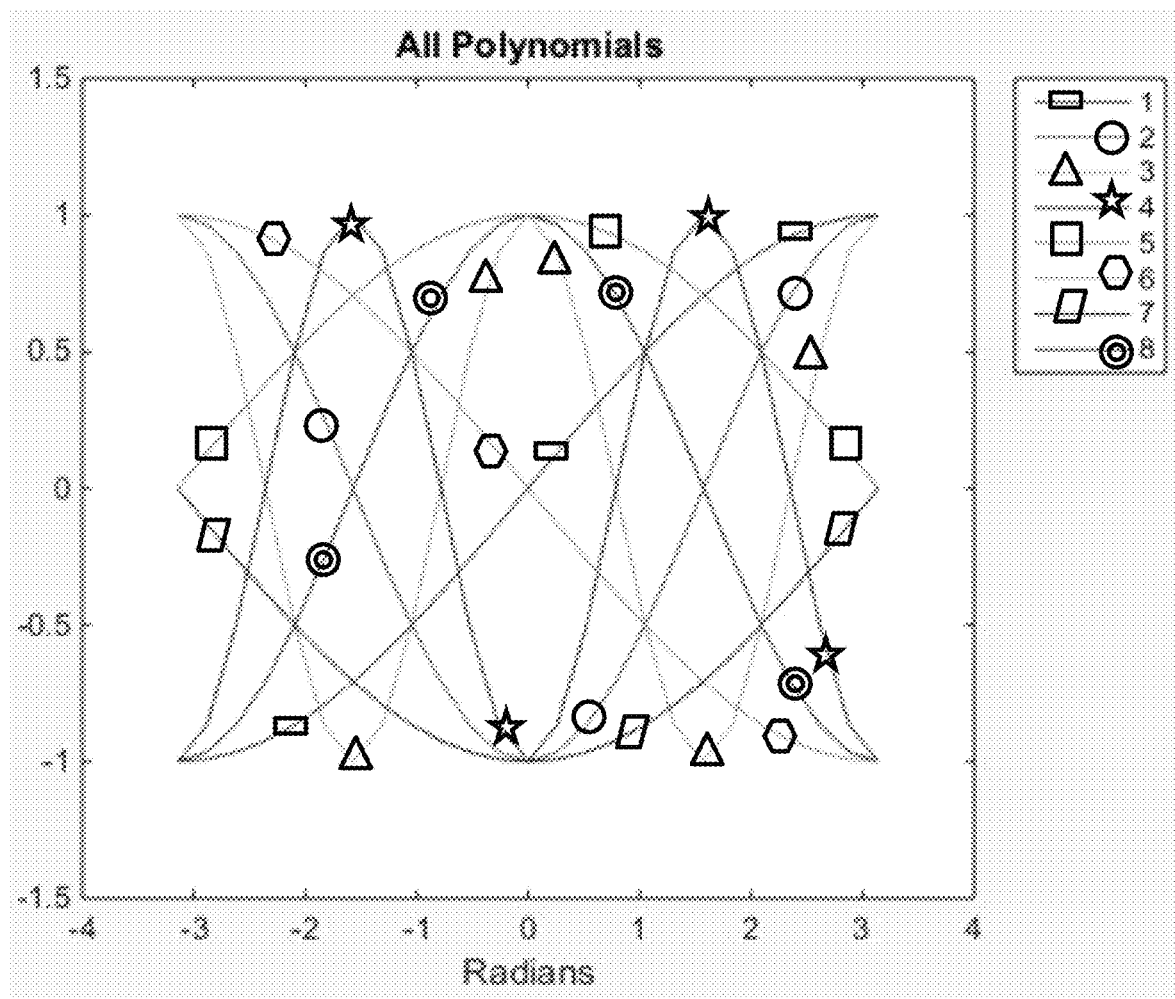
FIG. 8 illustrates an exemplary plot of Fractional Cycle Modulation Waveforms.

In FIG. 8, Fractional Cycle Modulation Waveforms, two of the symbol waveforms each complete two cycles over the interval $-\pi$ to $\pi$; two of the symbol waveforms each complete one cycle over the interval $-\pi$ to $\pi$; and four of the symbol waveforms each complete one-half cycle over the interval $-\pi$ to $\pi$.

As with other modulation techniques, such as Phase Shift Keying (PSK) or Quadrature Amplitude Modulation (QAM), FCM communication can be based on assigning a bit string to each symbol waveform. A message may be transmitted by translating bits to symbol waveforms in the encoder or elsewhere in the transmit string, transmitting the symbol waveforms using the transmitter and by recognizing the sequence of transmitted symbol waveforms in the receiver and looking up the corresponding bit strings in the decoder or other processor in the receive string.

In terms of the preceding discussion, a benefit of a FCM PSW alphabet may be that it has relatively high minimum RMS separation, resulting in good noise resistance. An accompanying characteristic of the FCM PSW alphabet may be a high OBW, resulting from large discontinuities between the PSWs at the symbol time boundaries. The present invention may make use of those FCM characteristics to provide an initial PSW alphabet for offset MC optimization, as described above. Using an FCM PSW alphabet as the initial PSW alphabet for offset MC optimization may result in a PSW alphabet similar to the one shown in FIG. 9, with higher minimum RMS separation.

Figure 9:
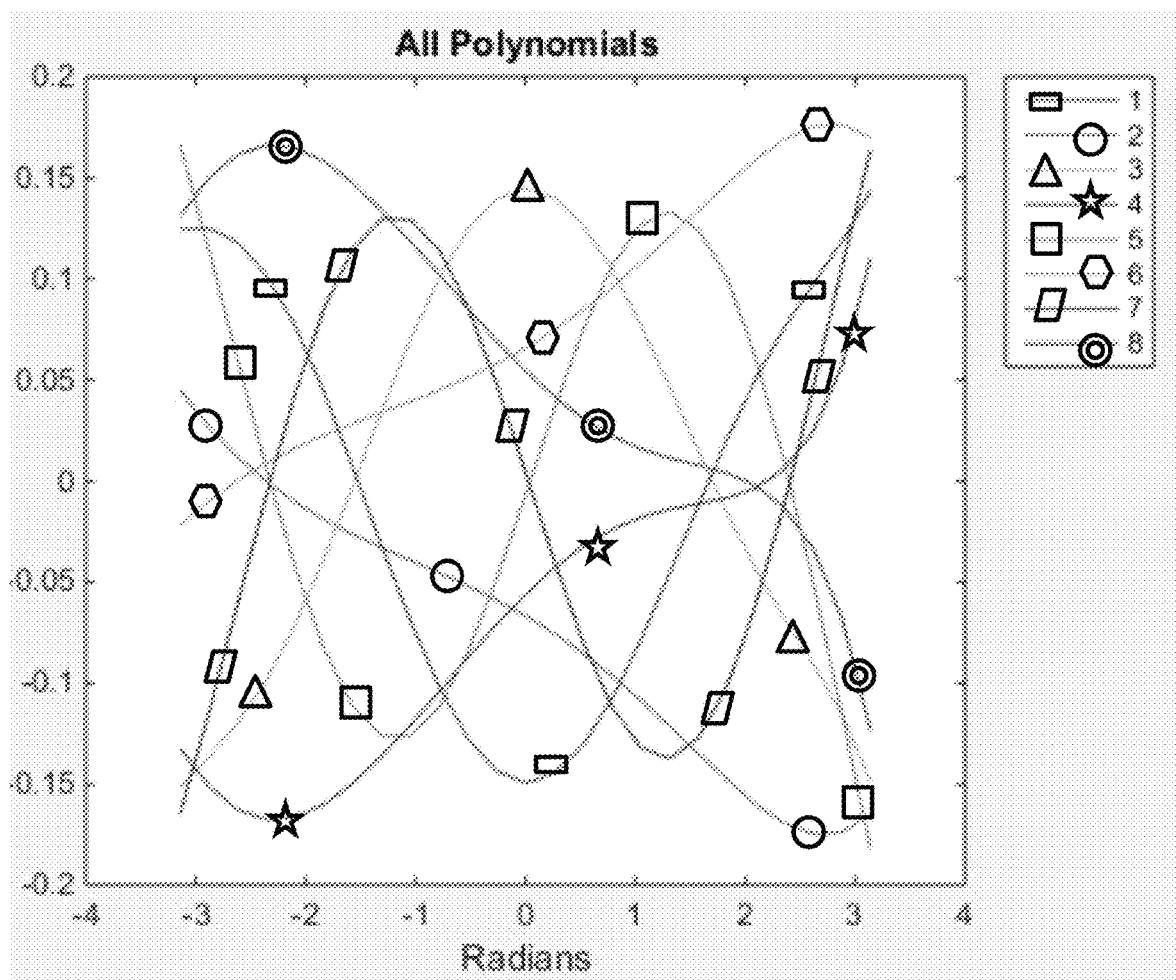
FIG. 9 illustrates an exemplary plot of a PSW Alphabet from Offset MC Optimization.
Figure 10:
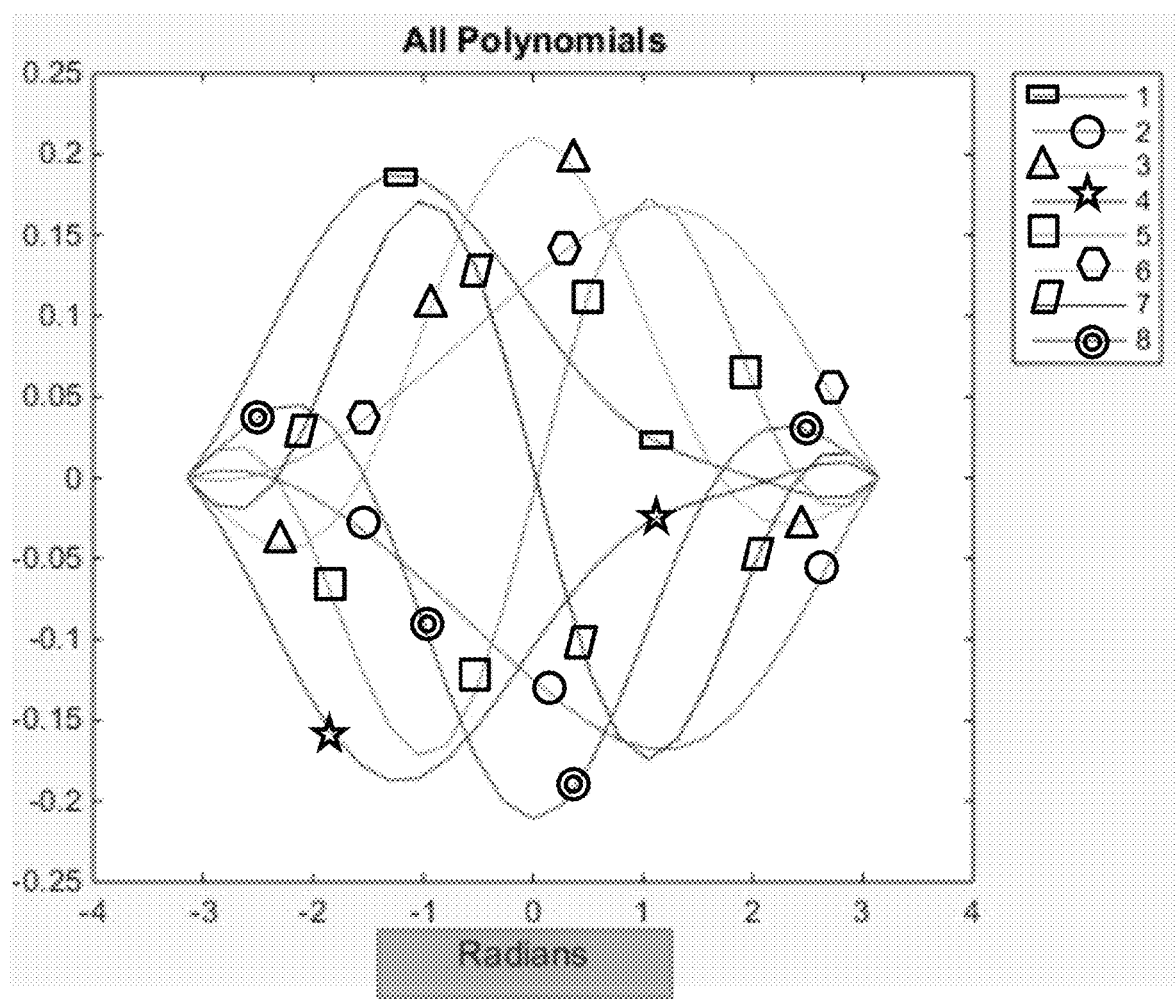
FIG. 10 illustrates an exemplary plot of a PSW Alphabet Convolved with Sinc Function Polynomial.

The PSW alphabet depicted in FIG. 9, PSW Alphabet from MC Optimization, can be shaped for OBW reduction or for other reasons by polynomial convolution, as disclosed above. For instance, the result of convolving the PSW alphabet shown in FIG. 9, PSW Alphabet from MC Optimization, with a polynomial version of the sinc function is shown in FIG. 10, PSW Alphabet Convolved with Sinc Function Polynomial. Notice that zeroth order DDs have been removed by the convolution and the PSW alphabet has been generally smoothed, which improves OBW performance.

In operation, a user of the present invention may perform Polynomial Symbol Waveform (PSW) design via or based on one of the methods described above to create a manipulated PSW alphabet with a power-of-two number of polynomials. As with traditional modulation, each polynomial in the alphabet will correspond to a bit sequence whose length is the log-base-two of the size of the alphabet.

The user will load the manipulated PSW alphabet into a channel encoder/modulator or other processor that will be used to convert an input bit sequence into an equivalent sequence of PSWs and into a decoder/demodulator that will convert the PSW sequence back into the bit sequence. The polynomials may be sampled to produce a time amplitude sequence (i.e., stream) for transmission.

In various embodiments, the PSW alphabet may be loaded into the transmitters and receivers as software in a software defined radio ("SDR") configuration. However, it will be appreciated that the PSW alphabet may be implemented via hardware and/or software that employ FPGAs, ASICs, CPUs, etc.

During the PSW alphabet design phase, the user may simulate transmission of the stream with or without channel impairments, such AWGN, to perform Occupied Bandwidth (OBW) measurements as a function of various parameters, such as Bit Error Rate (BER) and Energy per bit to Noise power (Eb/No).

The stream is transmitted and then received by the receiver. The received stream is then decoded/demodulated using the PSW alphabet loaded into the receiver to reproduce the bit sequence provided to the transmitter.

The foregoing description and accompanying drawings illustrate the principles, preferred embodiments and modes of operation of the invention. However, the invention should not be construed as being limited to the particular embodiments discussed above. Additional variations of the embodiments discussed above will be appreciated by those skilled in the art.

Therefore, the above-described embodiments should be regarded as illustrative rather than restrictive. Accordingly, it should be appreciated that variations to those embodiments can be made by those skilled in the art without departing from the scope of the invention as defined by the following claims.

What is claimed is:

1. A system comprising:
at least one transmitter to
receive an input bit sequence,
convert the input bit sequence into a sequence of polynomial symbol waveforms (PSWs) selected from a designed PSW alphabet,
the designed PSW alphabet being formed by
providing an initial PSW alphabet having polynomial coefficients and polynomial roots, modifying at least one of the polynomial coefficients or polynomial roots of the initial PSW alphabet to produce the designed PSW alphabet, where modifying the PSW alphabet includes at least one of:
translating at least one polynomial root from one or more PSWs of the PSW alphabet from a starting location to an end location in the complex plane, and
adjusting complex conjugates of translated roots that are complex to keep the polynomial real-valued, and
transmit the sequence of polynomial symbol waveforms; and
at least one receiver to
receive the sequence of polynomial symbol waveforms,
convert the received sequence of polynomial symbol waveforms into an output bit sequence based on the designed PSW alphabet, and
output the output bit sequence.

2. The system of claim 1, where modifying the PSW alphabet includes:
shaping the PSW alphabet to produce the designed PSW alphabet.

3. The system of claim 1, where modifying the PSW alphabet includes:
shaping at least one of the translated and adjusted PSWs using polynomial convolution to provide the designed PSW alphabet.

4. The system of claim 3, where
the end location for the translated polynomial roots are at the symbol time boundaries with amplitude zero.

5. The system of claim 3, where
the polynomial convolution is performed using one of raised cosine, root raised cosine, Gaussian, or other band-limiting or pulse-shaping filters.

6. The system of claim 1, where modifying includes
applying random variation to at least one of the polynomial coefficients and polynomial roots of an initial PSW alphabet to produce an edited PSW alphabet;
calculating a goodness measure for the initial and edited PSW alphabets;
comparing the goodness measure of the initial PSW alphabet to the goodness measure of the edited PSW alphabet; and
setting the initial PSW alphabet equal to the edited PSW alphabet when the edited PSW alphabet has a higher goodness measure.

7. The system of claim 6, where
the random variation is determined by at least one of Monte Carlo optimization and machine learning.

8. The system of claim 6, further comprising
performing a power normalization of the edited PSW alphabet after applying the random variation.

9. The system of claim 6, further comprising
setting the initial PSW alphabet to the edited PSW alphabet when the goodness measure of the edited PSW alphabet is better than the goodness measure of the initial PSW alphabet.

10. The system of claim 9, where
the initial PSW alphabet is modified for at least one of a number of repetitions, until a goodness measure is achieved, and until a goodness measure is maximized.

11. The system of claim 6, where
the goodness measure for a PSW alphabet is based on calculating the minimum Root Mean Square (RMS) separation between all pairs of PSWs with a higher minimum RMS separation being interpreted as a higher goodness measure.

12. The system of claim 1, where
the initial PSW alphabet is provided using fractional cycle modulation to generate the PSWs.

13. A non-transitory computer readable medium storing instructions, the instructions comprising:
one or more instructions which, when executed by one or more processors, cause the one or more processors to modify the initial PSW alphabet as provided in claim 1.

14. A non-transitory computer readable medium storing instructions, the instructions comprising:
one or more instructions which, when executed by one or more processors, cause the one or more processors to:
convert, by a transmitter, an input bit sequence into a sequence of polynomial symbol waveforms (PSWs) selected from a designed PSW alphabet,
the designed PSW alphabet being formed by
providing an initial PSW alphabet having polynomial coefficients and polynomial roots,
modifying at least one of the polynomial coefficients or polynomial roots of the initial PSW alphabet to produce the designed PSW alphabet, where the initial polynomial symbol waveform alphabet is modified to a higher minimum RMS separation between the polynomial symbol waveforms; and
transmit, by the transmitter, the sequence of polynomial symbol waveforms.

15. A system comprising:
a transmitter to
receive an input bit sequence,
convert the input bit sequence into a sequence of polynomial symbol waveforms (PSWs) selected from a designed PSW alphabet,
the designed PSW alphabet being formed by
providing an initial PSW alphabet having polynomial coefficients and polynomial roots,
modifying at least one of the polynomial coefficients or polynomial roots of the initial PSW alphabet to produce the designed PSW alphabet, where the initial polynomial symbol waveform alphabet is modified to provide a higher minimum RMS separation between the polynomial symbol waveforms, and
transmit the sequence of polynomial symbol waveforms.

16. The system of claim 15, further comprising:
a receiver to
receive the sequence of polynomial symbol waveforms,
convert the received sequence of polynomial symbol waveforms into an output bit sequence based on the designed PSW alphabet, and
output the output bit sequence.

17. The system of claim 15, where
the initial polynomial symbol waveform alphabet is a random PSW alphabet.

18. The system of claim 15, where
the initial polynomial symbol waveform alphabet is a SPDM PSW alphabet.

19. The system of claim 15, where
the initial polynomial symbol waveform alphabet is modified to maximize RMS separation between the polynomial symbol waveforms.

20. The system of claim 15, where
the initial polynomial symbol waveform alphabet is modified using instantaneous spectral analysis.

\* \* \* \* \*